US010197665B2

(12) United States Patent
Orr et al.

(10) Patent No.: US 10,197,665 B2
(45) Date of Patent: Feb. 5, 2019

(54) RADAR FALSE ALERT REDUCTION

(71) Applicant: Escort, Inc., West Chester, OH (US)

(72) Inventors: Steven K. Orr, Cincinnati, OH (US); John Kuhn, Cincinnati, OH (US); Jeff Stevens, Liberty Township, OH (US); Thomas W. Humphrey, Glendale, OH (US)

(73) Assignee: Escort Inc., Chicago, IL (US)

( * ) Notice: Subject to any disclaimer, the term of this patent is extended or adjusted under 35 U.S.C. 154(b) by 217 days.

(21) Appl. No.: 15/062,983

(22) Filed: Mar. 7, 2016

(65) Prior Publication Data

US 2016/0187461 A1    Jun. 30, 2016

Related U.S. Application Data

(63) Continuation of application No. 13/794,867, filed on Mar. 12, 2013, now Pat. No. 9,279,881.

(51) Int. Cl.
  *G01S 7/02* (2006.01)
  *G01S 7/04* (2006.01)
  *G01S 13/00* (2006.01)

(52) U.S. Cl.
  CPC .............. *G01S 7/022* (2013.01); *G01S 7/023* (2013.01); *G01S 7/04* (2013.01)

(58) Field of Classification Search
  CPC . G01S 7/022; G01S 7/023; G01S 7/04; G01S 13/92; G08G 1/04; G08G 1/054
  See application file for complete search history.

(56) References Cited

U.S. PATENT DOCUMENTS 3,754,253 A * 8/1973 Balsiger ............... G08G 1/054
                                                    342/104
3,956,626 A    5/1976 Ross
(Continued)

FOREIGN PATENT DOCUMENTS

CN    101889215 B    5/2013
EP    1 672 379 A2    6/2016
(Continued)

OTHER PUBLICATIONS

European Search Report for Application No. 14786048.0-1812 dated Nov. 10, 1966, 9 pages.
(Continued)

*Primary Examiner* — Bernarr E Gregory
(74) *Attorney, Agent, or Firm* — Hitchcock Evert LLP

(57) ABSTRACT

A radar detector suppresses alerts from vehicle guidance systems, by sweeping for a consistent radar signal; the center frequency of the signal is stored and the detector suppresses warnings of radar signals near that frequency. The detector uses an enhanced method for suppression of signals near a known location of a false signal source; in the event the detector detects a radar signal and finds a matching stored false signal, the detector will first compare the strength of the received signal to a threshold strength that is computed based upon the distance of the detector from the stored false signal, and will only suppress signals below threshold. The detector includes a camera directed to the road in the vicinity of the vehicle. Image data from the camera is processed to identify police vehicles as identified by flashing lights, a profile including a rooftop light bar and/or highly contrasting colored panels.

13 Claims, 4 Drawing Sheets

(56) References Cited

U.S. PATENT DOCUMENTS

| | | | |
|---|---|---|---|
| 4,360,811 A | 11/1982 | Cantwell et al. | |
| 4,866,438 A * | 9/1989 | Knisch | G08G 1/054 340/936 |
| 5,021,961 A | 6/1991 | Ross et al. | |
| 5,151,701 A | 9/1992 | Valentine et al. | |
| 5,206,651 A | 4/1993 | Valentine et al. | |
| 5,218,467 A | 6/1993 | Ross et al. | |
| 5,229,947 A | 7/1993 | Ross et al. | |
| 5,250,951 A | 10/1993 | Valentine et al. | |
| 5,280,288 A * | 1/1994 | Sherry et al. | G01S 7/023 |
| 5,510,793 A | 4/1996 | Gregg, III et al. | |
| 5,515,042 A | 5/1996 | Nelson | |
| 5,515,402 A | 5/1996 | Chester | |
| 5,598,338 A | 1/1997 | Taniguchi et al. | |
| 5,617,085 A | 4/1997 | Tsutsumi et al. | |
| 5,742,340 A | 4/1998 | Alves | |
| 5,784,021 A | 7/1998 | Oliva | |
| 5,815,092 A | 9/1998 | Gregg, III et al. | |
| 5,852,417 A | 12/1998 | Valentine et al. | |
| 5,859,628 A | 1/1999 | Ross et al. | |
| 5,912,822 A * | 6/1999 | Davis et al. | G01S 13/92 |
| 5,935,190 A * | 8/1999 | Davis et al. | G01S 13/92 |
| 5,938,717 A | 8/1999 | Dunne et al. | |
| 5,948,038 A * | 9/1999 | Daly et al. | G08G 1/04 |
| 5,977,884 A | 11/1999 | Ross | |
| 6,118,403 A | 9/2000 | Lang | |
| 6,201,493 B1 | 3/2001 | Silverman | |
| 6,204,798 B1 | 3/2001 | Fleming, III | |
| 6,265,989 B1 | 7/2001 | Taylor | |
| 6,266,617 B1 | 7/2001 | Evans | |
| 6,384,776 B1 | 5/2002 | Martin | |
| 6,400,304 B1 | 6/2002 | Chubbs, III | |
| 6,442,485 B2 | 8/2002 | Evans | |
| 6,449,540 B1 | 9/2002 | Rayner | |
| 6,469,653 B1 | 10/2002 | Haynes | |
| 6,480,144 B1 | 11/2002 | Miller et al. | |
| 6,483,452 B1 | 11/2002 | Iwakini | |
| 6,498,569 B2 | 12/2002 | Dijkstra | |
| 6,567,035 B1 | 5/2003 | Elliott | |
| 6,670,905 B1 | 12/2003 | Orr | |
| 6,675,085 B2 | 1/2004 | Straub | |
| 6,718,239 B2 | 4/2004 | Rayner | |
| 6,748,322 B1 | 6/2004 | Fernandez | |
| 6,750,785 B2 | 6/2004 | Trajkovic et al. | |
| 6,845,317 B2 | 1/2005 | Craine | |
| 6,895,324 B2 | 5/2005 | Straub | |
| 6,943,723 B2 | 9/2005 | Kim et al. | |
| 6,980,092 B2 | 12/2005 | Turnbull et al. | |
| RE39,038 E | 3/2006 | Fleming, III | |
| 7,042,345 B2 | 5/2006 | Ellis | |
| 7,183,942 B2 | 2/2007 | Rock et al. | |
| 7,301,494 B2 | 11/2007 | Waters | |
| 7,403,153 B2 * | 7/2008 | Kelly, Jr. et al. | G01S 7/023 |
| 7,471,236 B1 | 12/2008 | Pitt et al. | |
| RE40,653 E | 3/2009 | Fleming, III | |
| 7,522,747 B2 * | 4/2009 | Horibe | G06K 9/6202 342/118 |
| 7,576,679 B1 | 8/2009 | Orr et al. | |
| 7,702,044 B2 | 4/2010 | Nallapureddy et al. | |
| 7,764,219 B2 | 7/2010 | Pitt et al. | |
| 7,804,440 B1 | 9/2010 | Orr | |
| RE41,905 E | 11/2010 | Fleming, III | |
| 7,899,450 B2 | 3/2011 | Pitt et al. | |
| 7,965,222 B2 | 6/2011 | Pitt et al. | |
| 7,999,721 B2 | 8/2011 | Orr | |
| 8,099,466 B2 | 1/2012 | Tenereillo et al. | |
| 8,185,132 B1 | 5/2012 | Katpelly et al. | |
| 8,255,155 B1 | 8/2012 | Crane et al. | |
| 8,373,588 B2 | 2/2013 | Kuhn | |
| 8,421,667 B2 | 4/2013 | Batten et al. | |
| 8,446,467 B2 * | 5/2013 | Tilton | G08G 1/054 340/933 |
| 8,466,806 B2 | 6/2013 | Schofield | |
| 8,515,414 B2 | 8/2013 | Pitt et al. | |
| 8,525,723 B2 | 9/2013 | Orr et al. | |
| 8,633,815 B2 * | 1/2014 | Al-Harbi | G08G 1/042 340/5.86 |
| 8,792,041 B2 | 7/2014 | Green et al. | |
| 8,842,004 B2 | 9/2014 | Kabler et al. | |
| 8,890,954 B2 | 11/2014 | O'Donnell et al. | |
| 8,896,694 B2 | 11/2014 | O'Donnell et al. | |
| 8,970,422 B2 | 3/2015 | Washlow et al. | |
| 9,132,773 B2 | 9/2015 | Washlow et al. | |
| 9,135,818 B2 | 9/2015 | Washlow et al. | |
| 2002/0135504 A1 | 9/2002 | Singer | |
| 2002/0152264 A1 | 10/2002 | Yamasaki | |
| 2003/0052797 A1 | 3/2003 | Rock et al. | |
| 2003/0080878 A1 | 5/2003 | Kirmuss | |
| 2003/0214430 A1 | 11/2003 | Husted et al. | |
| 2003/0218562 A1 | 11/2003 | Orr | |
| 2004/0056778 A1 | 3/2004 | Hilliard | |
| 2004/0107037 A1 | 6/2004 | Straub | |
| 2004/0233036 A1 | 11/2004 | Sefton | |
| 2004/0254729 A1 | 12/2004 | Browne et al. | |
| 2005/0242984 A1 | 11/2005 | Waters | |
| 2006/0089792 A1 | 4/2006 | Manber et al. | |
| 2006/0132349 A1 | 6/2006 | Stern et al. | |
| 2006/0271593 A1 | 11/2006 | De Mes et al. | |
| 2007/0035632 A1 | 2/2007 | Silvernail et al. | |
| 2007/0046531 A1 | 3/2007 | Yu | |
| 2007/0109187 A1 | 5/2007 | Murphy | |
| 2007/0216521 A1 | 9/2007 | Guensler et al. | |
| 2008/0211914 A1 | 9/2008 | Herrera et al. | |
| 2009/0016418 A1 | 1/2009 | Silver et al. | |
| 2009/0160696 A1 * | 6/2009 | Pare et al. | G01S 7/023 |
| 2009/0256736 A1 | 10/2009 | Orr | |
| 2010/0157061 A1 | 6/2010 | Katsman et al. | |
| 2010/0214148 A1 | 8/2010 | Kuhn | |
| 2010/0214149 A1 | 8/2010 | Kuhn | |
| 2010/0250369 A1 | 9/2010 | Peterson et al. | |
| 2010/0317420 A1 | 12/2010 | Hoffberg | |
| 2011/0025851 A1 | 2/2011 | Rumble | |
| 2011/0149933 A1 | 6/2011 | Pitt et al. | |
| 2012/0136559 A1 | 5/2012 | Rothschild | |
| 2012/0229657 A1 | 9/2012 | Calman et al. | |
| 2012/0236173 A1 | 9/2012 | Telek et al. | |
| 2012/0268306 A1 | 10/2012 | Coburn et al. | |
| 2012/0311559 A1 | 12/2012 | Clark et al. | |
| 2012/0326889 A1 | 12/2012 | Kabler et al. | |
| 2013/0009760 A1 | 1/2013 | Washlow et al. | |
| 2013/0063554 A1 | 3/2013 | Green et al. | |
| 2013/0091548 A1 | 4/2013 | Song | |
| 2013/0194381 A1 | 8/2013 | McMahon et al. | |
| 2013/0201051 A1 * | 8/2013 | Kreter | G01S 13/91 342/52 |
| 2013/0207829 A1 | 8/2013 | Kabler et al. | |
| 2013/0211707 A1 | 8/2013 | Washlow et al. | |
| 2013/0214939 A1 | 8/2013 | Washlow et al. | |
| 2013/0238168 A1 | 9/2013 | Reyes | |
| 2014/0368601 A1 | 12/2014 | deCharms | |
| 2014/0375800 A1 | 12/2014 | Lim et al. | |
| 2015/0009347 A1 | 1/2015 | O'Donnell et al. | |
| 2015/0036047 A1 | 2/2015 | Bledsoe | |
| 2015/0123834 A1 | 5/2015 | Kabler et al. | |
| 2015/0224929 A1 | 8/2015 | McCarthy et al. | |
| 2015/0237252 A1 | 8/2015 | O'Donnell et al. | |

FOREIGN PATENT DOCUMENTS

| | | |
|---|---|---|
| GB | 2456782 A | 7/2009 |
| JP | 2003-132488 A | 5/2003 |
| JP | 2006-058191 A | 3/2006 |
| JP | 2006-171001 A | 6/2006 |
| JP | 2008-269178 A | 11/2008 |
| JP | 2009-097865 A | 5/2009 |
| JP | 2009-277059 A | 11/2009 |
| RU | 96951 U1 | 8/2010 |
| WO | 2000029869 A1 | 5/2000 |
| WO | 2001055744 A2 | 8/2001 |
| WO | 2010096760 A1 | 8/2010 |
| WO | 2011071826 A1 | 6/2011 |

(56) References Cited

FOREIGN PATENT DOCUMENTS

WO         2011087714 A1     7/2011
WO         2014151793 A2     9/2014

OTHER PUBLICATIONS

Kuhn, U.S. Pat. No. 8,373,588 B2, issued on Feb. 12, 2013, from U.S. Publication No. 2010/0214148 A1.
Pitt et al., U.S. Pat. No. 8,515,414 B2, issued on Aug. 20, 2013, from U.S. Publication No. 2011/0149933 A1.
Cerico KK, Japanese Publication No. JP-A-2003-132488, published on May 9, 2003, 36 pages (including English abstract) and machine translation thereof, 39 pages.
Yupiterulnd Co Ltd, Japanese Publication No. JP-A-2006-058191, published on Mar. 2, 2006, 28 pages (including English abstract) and machine translation thereof, 41 pages.
Traffic Plus KK, Japanese Publication No. JP-A-2008-269178, published on Nov. 6, 2008, 42 pages (including English abstract) and machine translation thereof, 46 pages.
Cellstar Kogyo KK, Japanese Publication No. JP-A-2009-097865, published on May 7, 2009, 12 pages (including English abstract) and machine translation thereof, 13 pages.
Denso Corp., Japanese Publication No. JP-A-2009-277059, published on Nov. 26, 2009, 18 pages (including English abstract) and machine translation thereof, 24 pages.
Miah et al., United Kingdom Publication No. GB-2456782 A, published on Jul. 29, 2009, 10 pages.
Res Inst Highway Mini Transp, Chinese Publication No. CN201718054 U, published on Jan. 19, 2011, 1 page (Espacenet Website showing English abstract).
Cobra Electronics Corporation, International Publication No. WO 2011/071826 A1, published on Jun. 16, 2011, 42 pages.
Cobra Electronics Corporation, International Publication No. WO 2011/087714 A1, published on Jul. 21, 2011, 52 pages.
Cobra Electronics Corporation, International Publication No. WO 2014/151793 A2, published on Sep. 25, 2014, 145 pages.
Lang, International Publication No. WO 2000/029869 A1, published on May 25, 2000, 16 pages.
Origin Technologies Limited, International Publication No. WO 2001/055744 A2, published on Aug. 2, 2001, 174 pages.
Escort, Inc, International Publication No. WO 2010/096760 A1, published on Aug. 26, 2010, 63 pages.
Valeo Raytheon Systems Inc, Japanese Publication No. JP-A-2006-171001, published on Jun. 29, 2006, 26 pages (including Espacenet Website showing English abstract).
Vinogradov Vyacheslav Evgenievich, Russian Utility Model Patent No. RU96951 U1, published on Aug. 20, 2010, 5 pages (including Espacenet Website showing English abstract).
Selex Sistemi Integrati SPA, Chinese Patent No. CN101889215 B, published on May 1, 2013, 29 pages (including Espacenet Website showing English abstract).
Beamberboy, Radar detector interface to iPhone, blog entry, Tuesday, Aug. 25, 2009, www.trapster.com, printed on Nov. 5, 2009.
What is Radar Active?, website, May 15, 2010, www.radaractive.com, as saved by Web.archive.org, printed on Jan. 21, 2013.
Amy Gilroy, Ford Prototype Car Talks to Other Cars, Jan. 26, 2011, www.ceoutlook.com, as printed on Feb. 3, 2011.
Tim Stevens, Ford's intelligent vehicles communicate wirelessly, shoot hula hoops out of tailpipes (video), Jan. 27, 2011, www.engadget.com, as printed on Jan. 21, 2013.
Mumble Webpage, http://muble.sourceforge.net, printed on Oct. 15, 2013.
Entry for "Multimedia Messaging Service" in Wikipedia at Wikipedia.org, retrieved on May 9, 2014.
Understand—Google Street View webpage, https://www.google.com/maps/streetview/understand/, printed on Dec. 7, 2015.
Garmin Dash Cam 35 webpage, https://buy.garmin.com/en-US/US/on-the-road/533/garmin-dash-cam-35/prod517726.html, printed on Dec. 7, 2015.
GoPro—HERO4 Black 4K Ultra HD Waterproof Camera webpage, https://shop.gopro.com/hero4/hero4-black/CHDHX-401.html, printed on Dec. 7, 2015.
F750—THINKWARE Dash Cam webpage, http://www.thinkware.com/Products/Dashcam/F750, printed on Dec. 7, 2015.

* cited by examiner

RADAR FALSE ALERT REDUCTION

CROSS-REFERENCE TO RELATED APPLICATIONS

This application is a continuation of U.S. application Ser. No. 13/794,867 filed Mar. 12, 2013, now U.S. Pat. No. 9,279,881, which is incorporated by reference in its entirety as if fully set forth herein.

BACKGROUND OF THE INVENTION

U.S. Pat. No. 6,670,905, invented by the inventor named herein, and hereby incorporated by reference, discloses a GPS enabled radar detector that uses GPS to aid in the management of non-police-related or otherwise irrelevant sources of radar signals, permitting the detector to dynamically improve its handling of such sources and reduce false alerts. The detector references previously-stored geographically-referenced information on such sources, and compares the detector's current location to locations of known stationary false alert sources of radar to improve the handling of detection of those sources. When the detector is within a threshold distance of a stored false alert source, the detector suppresses alerts to frequency bands or sub-bands that correlate to the frequency of the known false alert source. False sources may be manually identified and "locked out" by the user, or may be automatically identified based upon multiple repeated encounters of the detector with the source at a particular geographic area.

Systems embodying the invention of the '905 patent have been successfully commercialized by the assignee of this application, and have proven commercially viable, but those systems remain subject to certain vulnerabilities which will be discussed herein.

One vulnerability is false radar alerts created by traffic sensing equipment installed in many major metropolitan areas. The signals from traffic sensors appear in police radar bands, and are emitted in short bursts at a regular cadence. Because traffic sensors are geographically fixed and operate in a consistent frequency range, it is possible for a radar detector user to manually lockout traffic sensor alerts; however, traffic sensor signals do not appear regularly enough to be reliably locked out automatically, at least without a greater than normal number of encounters. In response to this source of false signals, the assignee developed a Traffic Sensor Rejection (TSR) method, which searches for the characteristic cadence and frequency of traffic sensor systems, and suppresses alerts of those systems using a processing logic separate from the location-based lockout described in the '905 patent. Because this logic is separate from location based lockouts, police radar or police-like false signal sources appearing in the same frequency band and same geographic area as a TSR signal will not be suppressed by the TSR method, which is preferable to a location based frequency lockout in that area which would potentially suppress police signals as well.

Another vulnerability is the increasing number of vehicle-borne radar sources. Examples include radar based systems attached to vehicles for lane sensing, adaptive cruise control, collision prevention, automated parking, and the like, which will be collectively identified herein as "vehicle guidance systems". One specific example of these systems is the Mercedes-Daimler Distronic system, which emits a 24.125 GHz K-band frequency to provide adaptive vehicle cruise control, which is in the band used by police and normally detected by a radar detector whenever it is near to an operative Distronic system. Vehicle guidance systems often create an annoying false alarm when a radar detector passes the source vehicle, and this false alarm cannot be suppressed based on location because the signal source is a mobile vehicle. The annoyance becomes critical when the vehicle with the radar detector is itself carrying a vehicle guidance system; the constant alerting in this scenario essentially puts the vehicle operator to a choice between disabling an entire band of radar detection (or foregoing radar detection entirely), and disabling the vehicle guidance system.

Efforts are underway by the assignee to identify characteristic cadences or other profiles of vehicle guidance systems, much as was done for TSR, and some have been effectively identified and suppressed via a separate methodology like that used for TSR. However, some vehicle guidance systems have so far eluded effective characterization in this manner.

A third vulnerability of the existing systems is that location based lockouts can potentially prevent alerting to police radar that happens to appear in the same frequency range and within a geographic range of a stationary source. As radar detectors become more sensitive the effective scope of a location lockout area must increase to ensure that alerts to the false signal are suppressed, which entails also increasing the geographic area in which alerts will be given to other sources in the same frequency ranges, including police radar sources. A regular criticism of location based lockout methods is the potential a radar detector will fail to alert to police radar which happens to coincide in location and frequency to a stored false signal. It would be desirable to improve the manner in which stationary false signals are processed to reduce the likelihood that an alert to actual police radar is suppressed.

A final vulnerability of the existing systems is the continuing adoption of 'instant-on' and line of site speed monitoring technology. A radar detector provides advance warning of police speed monitoring by detecting the monitoring of other cars that are typically ahead of the vehicle carrying the radar detector. Modern radar guns which operate in the Ka band can turn on and off rapidly, on a car-by-car basis. If there is a long enough interval between uses of the gun, a radar detector will not be able to pick up the stray radar emissions from previous interrogations to give advance warning of the use of radar. Laser (LIDAR) speed detection poses an even greater challenge for the reason that it is generally line of sight and provides very little advance warning of its use, if any. To respond to these challenges the assignee and others have developed social networks through which drivers can share radar events and sightings of police into a social network, so that a warning can be delivered to other drivers approaching the area. Unfortunately, users of social networks often report police activities that are not actually speed traps, for example, social network users may warn of a police car that is driving with traffic, waiting at a traffic light on a cross street, or involved in other activities that are not characteristic of a fixed location speed trap. Alerts that can be confirmed, e.g., via radar detection, are more reliable, but the social network cannot rely only upon radar-based alerts, for the reason that a police car on station at a speed trap may be using instant-on radar or LIDAR, in which case not every vehicle will be exposed to radar. Accordingly, it would be useful to provide a method for better identifying particular situations which are actually indicative of a speed trap, such as police positioned at a roadside monitoring passing traffic, or operating its light bar adjacent to a stopped car.

SUMMARY OF THE INVENTION

The present invention addresses the shortcomings of the prior art by improving a radar detector in accordance with several different aspects.

According to a first aspect of the present invention, the challenge of false alarms from vehicle guidance systems is addressed by introducing a local source lockout sequence into the operation of a radar detector. The local source lockout sequence may be performed at any time of detector operation, but in one example it is performed when the radar detector is first powered. In the local source lockout sequence the radar detector sweeps for radar signals that are steadily present and/or appear to be location independent, and thus are characteristic of vehicle guidance systems on the vehicle carrying the radar detector. If such a signal is found, the radar detector identifies a center frequency for the signal, and stores that center frequency for future reference. Thereafter, the detector will suppress warnings of a radar signal that is detected at frequencies that are near to the stored center frequency. The center frequency may be in any of the sensitive bands of the radar detector, including the K-band, Ka-band or X-band. Furthermore, the detector may have a setting to enable or disable the local source lockout sequence, so that this sequence may be disabled, e.g., for vehicles that do not have vehicle guidance systems. Furthermore, the detector may identify cases in which two discriminable signals appear within the range of the stored center frequency, and in those cases, the detector will produce an alert (provided there is no applicable location-based lockout), thus avoiding to the extent possible suppressing police radar alerts.

In a second aspect, the invention features an enhanced method for suppression of signals near a known location of a false signal source. Specifically, in the event the detector detects a radar signal and finds a matching stored false signal (that is, the detected signal is within the frequency subrange of the stored false signal, and the detector is in a location near to the stored a known false signal source), rather than suppressing the received signal, the detector will first compare the strength of the received signal to a threshold strength that is computed based upon the distance of the detector from the stored false signal, and if the received signal exceeds the threshold strength the alert of the received signal is reported to a more prominent extent than if the received signal is below the threshold strength. For example, signals below the threshold may be reported by a minimal visual alert without accompanying warning sounds, whereas signals above the threshold may be reported with visual and audible cues in the manner of other radar signal detections. In the specific embodiment disclosed, the threshold is set at 3 dB higher than an expected signal strength, and the expected signal strength is computed according to an inverse square-law relationship between signal strength and the distance of the radar detector from location stored for the false signal source. In a most particular embodiment, signals falling below the threshold are tracked over time and in the event they are persistent over time, an alert is generated to those signals notwithstanding signal strength below the threshold.

According to a third aspect, the invention features an enhanced method for identifying police activity that is indicative of a speed trap, to improve the reliability of warnings of police activity delivered via social networks. To implement this method, a camera is integrated into a radar detector, the camera directed to the road in the vicinity of the vehicle. The radar detector gathers image data from the camera and processes that data to identify police vehicles in the image. In particular embodiments the processing by the radar detector evaluates sequential images to identify flashing lights characteristic of a functioning light bar on a police or emergency vehicle. In another embodiment the processing by the radar detector evaluates one or more images to identify the profile of a vehicle that is characteristic of a police vehicle (e.g., having a rooftop light bar and/or highly contrasting colored panels) and/or which is stationed to monitor traffic, such as at a roadside in a position that is not correlated with crossing traffic at an intersection. The radar detector may respond to image(s) indicative of police activity by automatically generating an alert to other drivers in a social network, or by suggesting to a vehicle operator the generation of such an alert, subject to validation by the vehicle operator.

The above and other objects and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
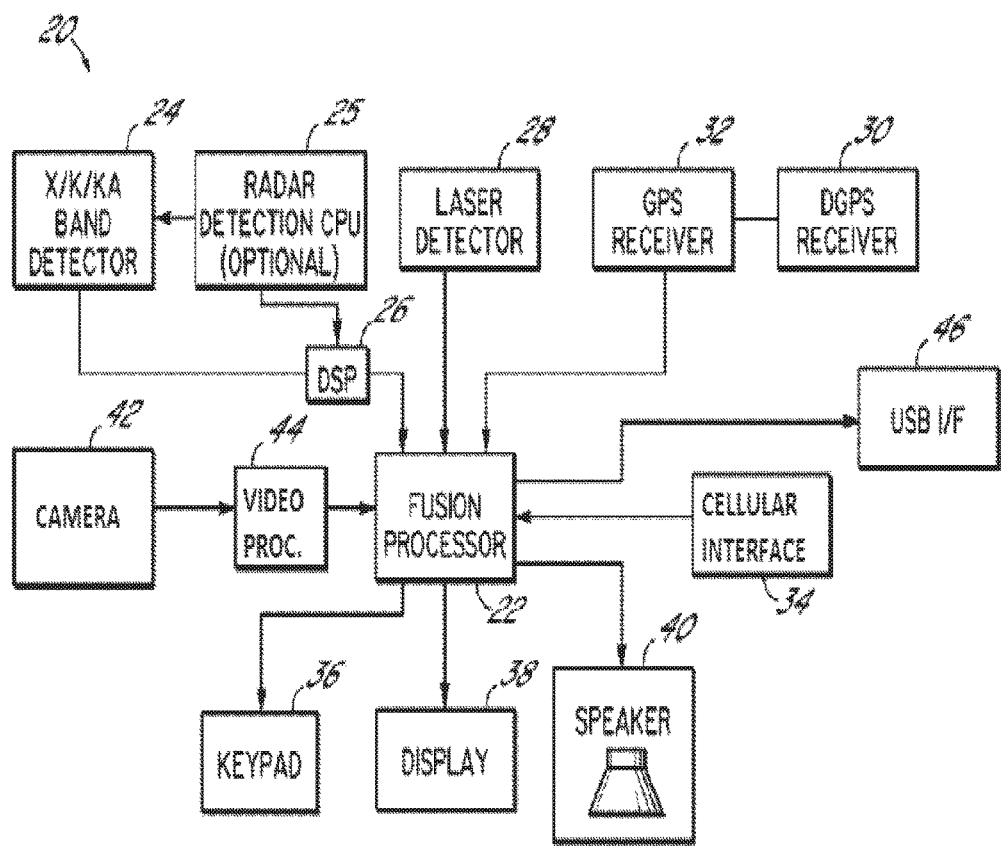
FIG. 1 shows a radar detector block diagram according to principles of the present invention.

FIG. 1 illustrates a radar detector 20 according to principles of the present invention, which features a fusion processor 22 for controlling all functions of the unit. Fusion processor receives information on radar signals from a conventional microwave receiver 24, coupled to processor 22 via a digital signal processor (DSP) 26. Microwave receiver 24 and DSP 26 may utilize any of the techniques known in the art for detection of radar signals, for rejecting noise and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 28 for detecting police LIDAR signals. Processor 22 is further connected to a GPS receiver 32 and a separate differential GPS (DGPS) receiver 30, such that differential GPS methodologies may be used where beacon signals are available.

Processor 22 executes a stored program, found in integrated or off-chip electrically erasable programmable read only memory (EEPROM), flash memory, or masked read only memory (ROM). The processor is programmed to manage and report detected signals in various ways depending on its stored program, including by methods described herein.

Processor is coupled to a cellular interface 34 to permit social network interaction with servers and data from other radar detectors. In one embodiment cellular interface 34 comprises a BLUETOOTH® (IEEE 802.15.1) or other 802.1x compliant radio for connecting to a cellular phone, smart phone, or other cellular device, which may operate on the control of a separate application such as the assignee's "Escort Live" smartphone app. In another embodiment cellular interface 34 may itself comprise a cellular radio for direct connection to cell towers. Other communication technologies may also be used for social network interaction, such as satellite telephony, mesh networking via wifi, BLUETOOTH® (IEEE 802.15.1), or 802.1x radio of other kinds, or other standards.

The radar detector further incorporates a user input keypad or switches 36. Operational commands are conveyed by the user to processor 22 via the keypad. Processor 22 is further connected to a display 38, which may comprise one or more light emitting diodes for indicating various status conditions, or in a more feature-rich device, may include an alphanumeric or graphical display for providing detailed information to a user. A speaker 40 is also provided to enable processor 22 to deliver audible feedback to a user under various alert conditions, as is elaborated below.

Processor 22 may further include a camera 42, positioned on a front-facing, side facing or rear facing surface of the device, and a video processor 44, such as for processing video or still images from camera 42 according to methods that are described herein.

Processor 22 is further coupled to a Universal Serial Bus (USB) interface 46 that provides a means for uploading and downloading information to and from processor 22. USB interface 46 may be used to automate the assimilation of coordinate information into data structures in EEPROM 34. USB interface 46 may also be used to interface the detector to a separate host computer or product application containing a larger storage capacity than available from internal memory. USB interface 46 may also be used for the purposes of firmware upgrade. From time to time updates and bug fixes may become available, e.g. through a manufacturer website. USB interface 46 will enable the user to apply the appropriate firmware upgrade or bug fix. USB interface 46 could also be used to add other user waypoints.

Figure 2:
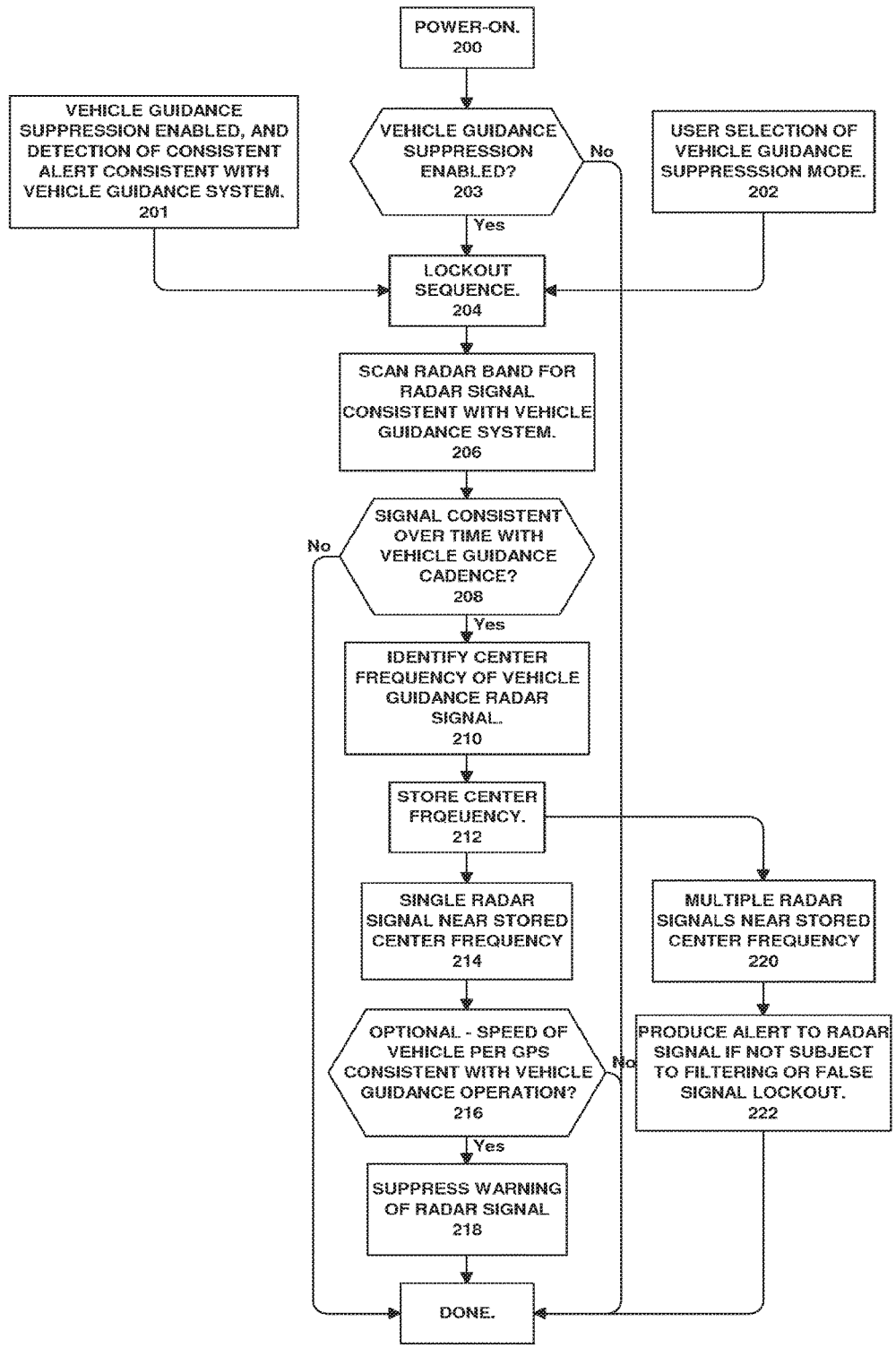
FIG. 2 shows a flow chart of operation of the radar detector of FIG. 1 performing a lockout of vehicle guidance related false signals.

Referring now to FIG. 2, methods for suppressing false alarms caused by vehicle guidance systems can be described. In general, the method of FIG. 2 uses a frequency based "lockout" (not location based), which can be used on all radar detector devices (GPS, or non-GPS based detectors). The feature can be enabled or disabled in the device Preferences. On GPS based detectors, consistency of an apparent false signal the vehicle speed can be used as a factor to disable a locked frequency range at speed ranges where the vehicle guidance systems are not enabled.

The lockout sequence 204 is enabled under several circumstances. For example, when the unit is powered on 200, if the vehicle guidance suppression mode is enabled 203, a lockout sequence 204 is performed. Alternatively, when the user encounters a vehicle guidance interference, and in response enables 202 the vehicle guidance suppression mode via a sequence of button presses, the lockout sequence may be performed. A third alternative is for the vehicle guidance lockout sequence to be automatically enabled 201 upon detection of a time consistent alert that is frequency consistent with a vehicle guidance system.

The lockout sequence 204 scans 206 the radar band for a radar signal consistent with the frequencies of known vehicle guidance systems. The signal is then evaluated 208 for consistency over time with the on/off cadence of the known vehicle guidance system. If these tests are passed, then in step 210 the center frequency of the short-range sensor of the guidance system is identified, and stored 212. The detector then pads that frequency above and below to allow for drift of both the signal and, if appropriate, the radar detector.

After a lockout has been stored, if (step 214) the detector identifies one signal in the range of the stored center frequency, it suppresses 218 an alert to the signal. For example the device may show a small visual indication that there is a detected signal, but it has been determined to be a vehicle guidance system. As a further optional test (step 216), in a GPS-enabled radar detector, the speed of the vehicle as reported by the GPS receiver may be compared to the known speed ranges of operation of the vehicle guidance system (some systems do not operate below a threshold speed, or above a threshold speed). Using this optional test 216, the alert is suppressed only if the vehicle's speed is consistent with operation of a vehicle guidance system.

When a lockout has been stored, if (step 220) the detector identifies two signals in the range of the stored center frequency, then the detector will proceed to step 220 and produce a normal alert to the radar signal, if the signal is not subject to filtering on other bases (such as TSR filtering or GPS-location based lockout)

Figure 3:
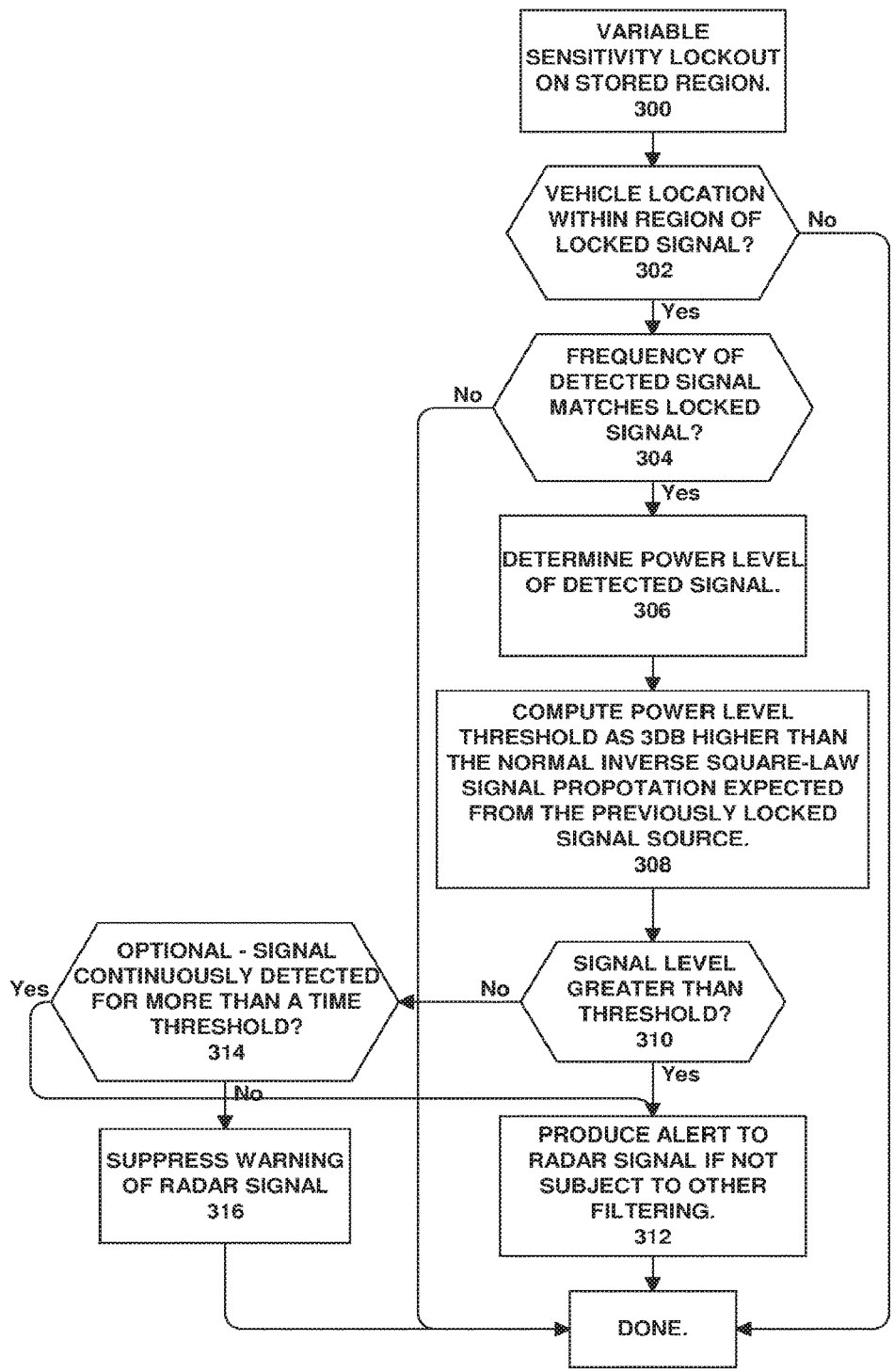
FIG. 3 shows a flow chart of operation of the radar detector of FIG. 1 performing evaluation of a detected radar signal in connection with stored locations of false signals.

Referring now to FIG. 3, improvements to location-lockout methods can be described. The background principle to this method is that, in free space, electromagnetic waves obey the inverse-square law, which states that the power density of an electromagnetic wave is proportional to the inverse of the square of the distance from a point source. Therefore the signal level measured by a radar detector will vary in proportion to the distance between it and a signal source that is detected by the radar detector. Current location based false signal rejection methods prevent the detection of all "qualified" signals detected within a lockout region. The lockout region, however, may encompass a large area where the radar detector is relatively sensitive.

A significant enhancement will be realized by redefining a lockout region to be "a region in which the Radar Detector's sensitivity varies in proportion to the distance between it and the focal points that define that region." The beneficial result is that police radar can still be reported, even if the police radar frequency matches one of the frequencies that is locked for false alarm signals for a given region. This method is accordingly referred to as "Variable Sensitivity Lockout Region" or VSLR.

In current GPS system without VSLR, the lockout decision is made by examining the current location of the detector to determine if it falls within any nearby regions, which may be defined in an octagonal shape for computational simplicity. The center of each of these Octagonal regions is referred to as a focal point. For each overlapping Octagonal region, a comparison is made between the frequency of the detected signal and the frequency of signals determined as being locked in each region. If there is a match, current GPS systems will suppress the reporting of the signal.

In a VSLR-enhanced method 300, shown in FIG. 3, after a determination 302 that the vehicle location is in the region of a locked signal, and it is determined 304 that the frequency of the detected signal is one of the frequencies locked in that region, extra steps must be performed before the signal suppression decision for each focal point can occur.

In a first step 306, the signal power level of the detected signal is determined, and in step 308, a threshold signal power level is computed, defined to be approximately 3 dB higher than the normal inverse square-law signal propagation expected from the previously locked signal source. If actual police radar at a locked frequency is being operated near a locked signal source, the police radar should be reported (and not suppressed) as soon as its signal level rises above this 3 dB threshold. Accordingly, in step 310, the received signal level is compared to the threshold, and if it is greater than the threshold, in step 312 an alert to the radar signal is produced, if the signal is not subject to other filtering such as TSR or vehicle guidance system suppression as discussed above. However, if the signal is below the threshold, then it is deemed to be from the locked stationary source, and (subject to optional processing discussed below) in step 316 warnings of the signal are suppressed.

Since it is possible that police radar could be operated immediately adjacent to a rejected stationary source it is important that the VSLR method report of locked signals, even if they are weaker than the 3 dB threshold. In current products of the assignee, a detected, locked signal is identified by a minimal visual indication on the radar detector display. This visual indication may, however, fail to adequately warn of a true police radar signal. Accordingly, In addition to using a signal level threshold as mentioned above, the VSLR method may optionally include a step 314 also use signal duration as a factor in the suppression decision. In one particular example, a time threshold is computed by first computing an average value of the difference between the detected signal's power level and the threshold power level. Call this average difference X, measured in dB. If the signal is continuously detected, it will be reported ($10*(1+X/4)$) seconds after the first detection. Thus, a signal which remains roughly 4 dB below the threshold will be reported after a 20 second delay.

Both the 3 dB signal level threshold of step 308 and the signal duration requirement of step 314 will be applied to all focal points for all locked false signals, which are the centers of nearby Octagonal regions that encompass the current position. Note, however, that if the suppression criterion for any focal point results in a decision to suppress an alert to a signal, none of the other focal points need to be considered relative to that signal. If all of the focal considerations fail to conclude in a signal suppression decision, the signal will be reported.

Figure 4:
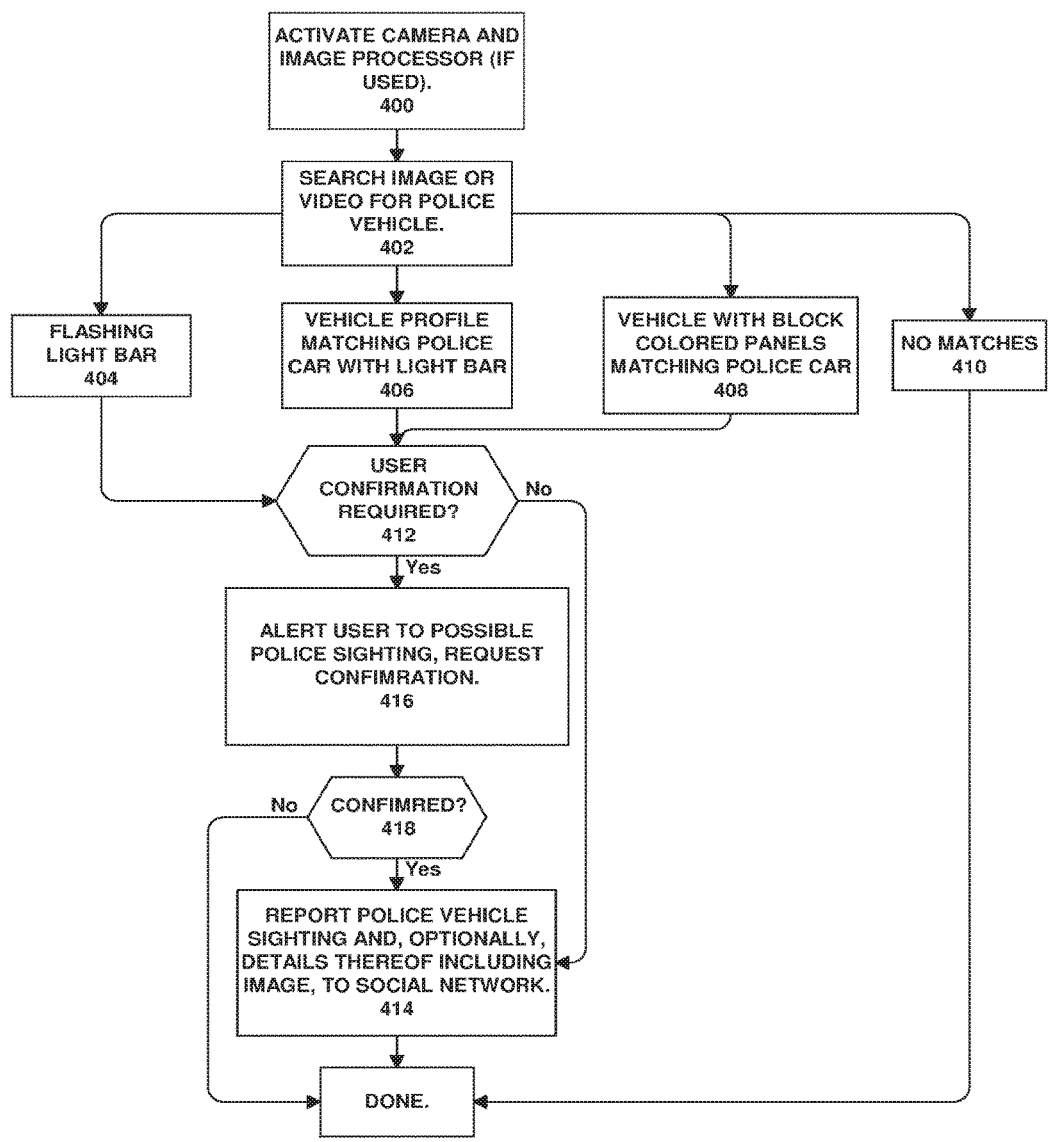
FIG. 4 shows a flow chart of operation of the radar detector of FIG. 1 performing evaluation of image or video data from the camera included in the detector.

Referring now to FIG. 4, methods of the present invention using camera 42 (FIG. 1) can be explained. As part of its regular survey of radar data, social network data and GPS data, the processor in step 400 will activate the camera and image processor to assess the scene visible to the camera. In step 402 the image processor, or fusion processor itself, will search the image or video available from the camera for the presence of a police vehicle or other vehicle of interest.

One circumstance of interest, step 404, is video reflecting a flashing light bar on the road, typically indicative of police or other emergency vehicles, according to a standardized color coding. Flashing police lights are strongly indicative of speed monitoring in the local area.

A second circumstance of interest, steps 406 and 408, is a vehicle profile in the image of the road that matches a police car. Per step 406 a vehicle with a profile that includes a light bar, that moves across the field of vision in a manner suggesting a roadside traffic monitoring vehicle, is indicative of a possible speed trap. Alternatively, per step 408, a vehicle with block colored panels that is similarly situated is likely a police vehicle and is suggestive of a speed trap.

In the event no circumstances of interest are identified, then the image processing is done until re-initiated. However, if a circumstance of interest is identified in step 404, 406 or 408, then in step 412 the particular circumstance is evaluated to determine if a user confirmation is required. Some circumstances, such as a flashing light bar, may be unambiguous as to their relevance to others in a social network, whereas other circumstances, such as a vehicle with block colored panels, may or may not be of interest. Accordingly, user confirmation may be required for some circumstances and not others. If user confirmation is required in step 412, then in step 416 the user is alerted to the possible police sighting and a confirmation is requested, which can be provided by a button on the detector, or on a cord connected to the detector.

If a particular sighting is confirmed, or if no confirmation is required, then a police vehicle sighting and its GPS location and, optionally, details thereof such as the image or video, vehicle direction and/or speed, and are reported to the social network for use in alerting others. If a sighting is not confirmed, however, the processing finishes without alerting the social network.

The present invention has been described in connection with several embodiments and some of those embodiments have been elaborated in substantial detail. However, the scope of the invention is not to be limited by these embodiments which are presented as exemplary and not exclusive. The scope of the invention being claimed is set forth by the following claims.

What is claimed is:

1. A radar detector adapted to identify and suppress alerts of locally generated radar signals from vehicle guidance systems, the radar detector comprising:
   a radar receiver for detecting radar signals; and
   signal processing electronics for controlling the radar receiver and evaluating detected radar signals, the signal processing electronics comprising a processor programmed via software to:
   perform a lockout sequence during operation of the radar detector, the lockout sequence comprising scanning a radar band for a vehicle guidance radar signal that is consistently received and otherwise consistent with vehicle guidance systems signal emissions from the vehicle carrying the radar detector;
   identify a frequency of a vehicle guidance signal emission identified in the preceding step, and storing the frequency; and thereafter
   suppress warnings of radar signals at frequencies within a range including the stored frequency.

2. The radar detector of claim 1 wherein the lockout sequence is performed when power is first applied to the radar detector.

3. The radar detector of claim 1 wherein in the lockout sequence the signal processing electronics scan for radar signals that are consistently received over time.

4. The radar detector of claim 1 wherein in the lockout sequence the signal processing electronics scan for radar signals that are consistently received at multiple locations.

5. The radar detector of claim 1 wherein the frequency is in one of K-band, Ka-band or X-band.

6. The radar detector of claim 1 wherein the signal processing electronics are configurable to be placed in an operative mode in which the lockout sequence is not performed.

7. The radar detector of claim 1 wherein the signal processing electronics perform a discrimination function to identify that two discriminable signals appear near to the stored frequency, the radar detector producing an alert in at least one instance when two discriminable signals are detected near to the stored frequency.

8. A radar detector that identifies visual information relevant to speed monitoring, comprising:
   a. a housing;
   b. a radar receiver for detecting radar signals integrated within the housing;
   c. electronics for controlling the radar receiver and evaluating detected radar signals integrated within the housing; and
   d. a camera integrated with the housing directed toward a road in a vicinity of a vehicle carrying the radar detector when the radar detector is in use,
   wherein the electronics gather image data from the camera and process the image data to identify the visual information relevant to speed monitoring in the image data,
   wherein the electronics evaluate time-sequential images to identify flashing lights characteristic of a functioning light bar on a police or emergency vehicle.

9. A radar detector that identifies visual information relevant to speed monitoring, comprising:
   a. a housing;
   b. a radar receiver for detecting radar signals integrated within the housing;
   c. electronics for controlling the radar receiver and evaluating detected radar signals integrated within the housing; and
   d. a camera integrated with the housing directed toward a road in a vicinity of a vehicle carrying the radar detector when the radar detector is in use,
   wherein the electronics gather image data from the camera and process the image data to identify the visual information relevant to speed monitoring in the image data,
   wherein the electronics evaluate one or more images to identify a vehicle profile characteristic of a police vehicle.

10. The radar detector of claim 9 wherein the vehicle profile includes a rooftop light bar.

11. The radar detector of claim 9 wherein the vehicle profile includes highly contrasting colored panels.

12. The radar detector of claim 9 wherein the vehicle profile comprises a vehicle stationed to monitor traffic.

13. A radar detector that identifies visual information relevant to speed monitoring, comprising:
   a. a housing;
   b. a radar receiver for detecting radar signals integrated within the housing;
   c. electronics for controlling the radar receiver and evaluating detected radar signals integrated within the housing; and
   d. a camera integrated with the housing directed toward a road in a vicinity of a vehicle carrying the radar detector when the radar detector is in use,
   wherein the electronics gather image data from the camera and process the image data to identify the visual information relevant to speed monitoring in the image data,
   wherein the electronics respond to one or more images indicative of police activity by generating an alert to other drivers in a social network either unilaterally or upon confirmation by a vehicle operator.

* * * * *

UNITED STATES PATENT AND TRADEMARK OFFICE
CERTIFICATE OF CORRECTION

PATENT NO. : 10,197,665 B2
APPLICATION NO. : 15/062983
DATED : February 5, 2019
INVENTOR(S) : Steven K. Orr et al.

It is certified that error appears in the above-identified patent and that said Letters Patent is hereby corrected as shown below:

In the Specification

Column 3, Line 39: delete "a" between "stored" and "known"

Column 3, Line 44: insert --,-- between "strength" and "the"

Column 3, Line 55: insert --a-- between "from" and "location"

Column 5, Lines 53-54: delete "consistency of an apparent false signal"

Column 7, Line 29: delete "In" and insert --in--

Column 8, Line 19: insert --in step 418-- after "confirmed"

Column 8, Line 20: insert --in step 414-- between "then" and "a"

Column 8, Line 22: delete "and" before "are reported"

In the Claims

Column 8, Line 46, Claim 1: delete "the" and insert --a--

Column 8, Line 51, Claim 1: insert --the-- before "radar signals"

Column 8, Lines 57-58, Claim 3: insert --the-- before "radar signals"

Column 8, Lines 60-61, Claim 4: insert --the-- before "radar signals"

Column 10, Line 9, Claim 10: insert --characteristic-- between "profile" and "includes"

Signed and Sealed this
Eighth Day of October, 2019

Andrei Iancu
*Director of the United States Patent and Trademark Office*

Column 10, Line 11, Claim 11: insert --characteristic-- between "profile" and "includes"

Column 10, Line 13, Claim 12: insert --characteristic-- between "profile" and "includes"